United States Patent Office 2,749,882
Patented June 12, 1956

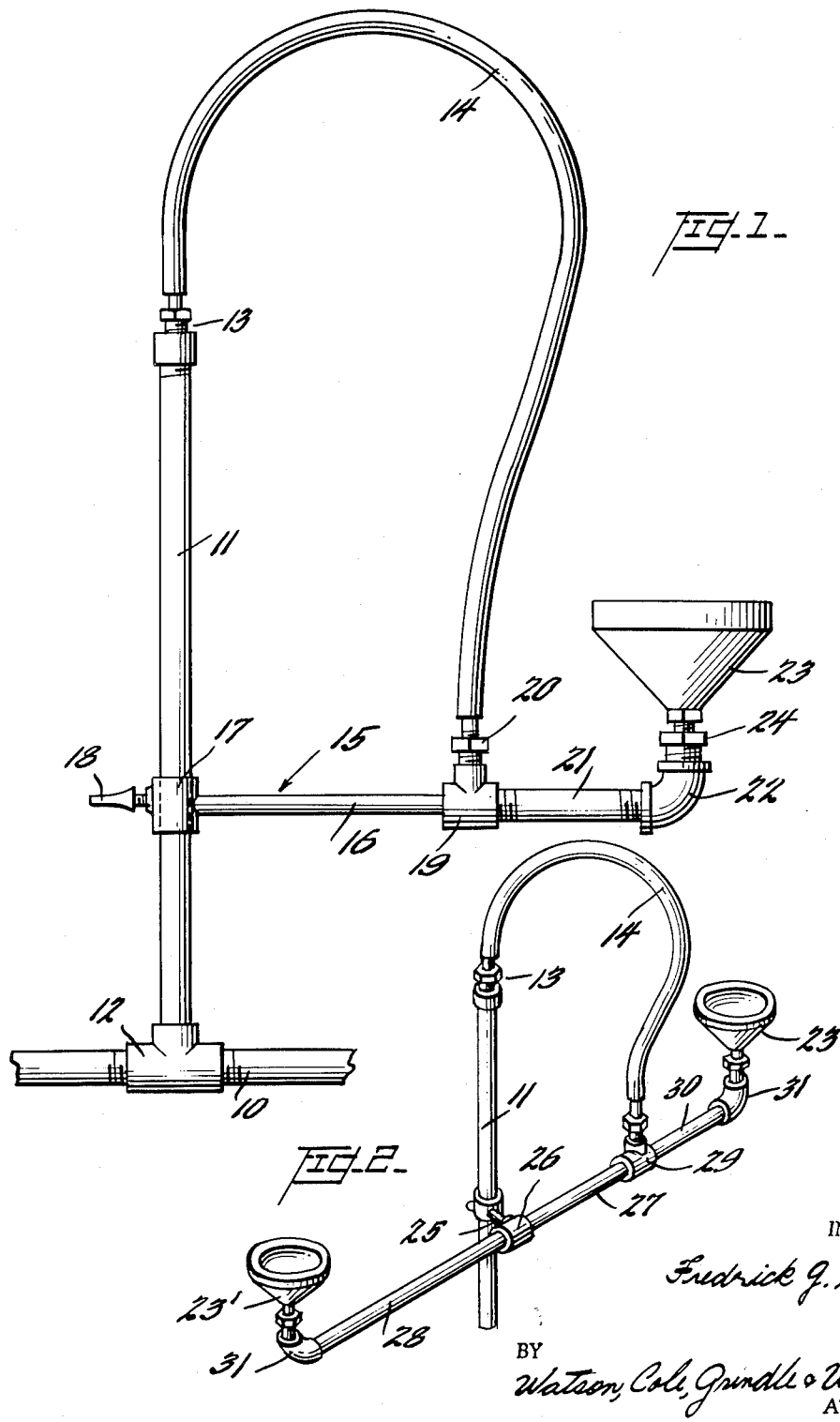

2,749,882
ADJUSTABLE HEIGHT STOCK-WATERING APPARATUS

Fredrick G. Butker, Winchester, Va., assignor to William M. Robbins, Hyattsville, Md.

Application December 23, 1954, Serial No. 477,309

6 Claims. (Cl. 119—74)

This invention relates to stock-watering apparatus and more particularly to watering devices, particularly for poultry, which are adjustable in height.

Very large numbers of poultry are raised by the use of mass production methods, the buildings used, for example in the raising of "broilers" frequently having capacities of ten thousand birds and upward. The birds are installed in such buildings within one or two days after hatching, and remain in the same building until ready for the market at about 10 to 13 weeks of age. During this relatively short period the growth of the birds, naturally, is at a rapid rate.

In raising poultry on such a large scale it is necessary to minimize manual labor and, to this end, automatic feeding and watering devices are very widely employed. For sanitary reasons, as well as to facilitate their use by the growing birds, it is necessary, at frequent intervals, to adjust the elevation of the feeding and/or watering devices.

The general object of the present invention is the provision of stock-watering apparatus, intended primarily for poultry but usable in connection with the raising of livestock in general, comprising a fountain or other water dispensing device supported in such a manner that it may be quickly and easily adjusted in elevation. Another object is the provision of a device of the character described, comprising in combination a horizontal conduit or main, a vertical conduit supported on and connected to the main, a horizontal support adjustably mounted on the vertical conduit, conduit means carried by the support, a flexible conduit connecting the vertical conduit with the said conduit means and a water dispensing device likewise connected to the said conduit means, all to the end that the water dispensing device may be rapidly and easily adjusted in elevation, by simply adjusting the elevation of the aforesaid horizontal support, and without disconnecting and re-connecting any joints in the piping connections between the main and the dispensing device or fountain.

Another object is the provision of an apparatus as defined in the preceding paragraph, in which two or more fountains may be served through a single flexible conduit, their elevation being altered at will by the adjustment of a single common support.

Other and further objects, features, and advantages will be apparent from the description which follows, read in connection with the accompanying drawings in which—

Figure 1 is a side elevation of a stock-watering apparatus constructed in accordance with the invention; and Figure 2 is a perspective view, on a reduced scale, of a further embodiment of the invention.

In order to facilitate an understanding of the invention, reference is made to the embodiments thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring to Figure 1, the device there illustrated comprises the horizontal conduit or water main 10, which preferably extends throughout the length of the broiler house or other building in which the livestock in question is housed. A generally vertical conduit 11 is connected to the horizontal conduit 10 by means of a standard T-fitting 12, the upper end of the vertical conduit 11 being connected, through any suitable coupling 13 with a flexible conduit 14 such as a section of high pressure hose or other suitable flexible tubing. A horizontal support 15 comprises a section of rod 16 provided at one end with a sleeve portion 17 adapted to be telescoped over the vertical conduit 11 and to be slidable vertically thereon. The support may be retained in any adjusted position by means of a wing bolt 18 extending through and having threaded engagement with the sleeve 17, and which may be tightened against the outer wall of the conduit 11.

To the outer end of the rod 16 there is secured a T-fitting 19 to which the flexible conduit 14 is connected by any suitable coupling means 20. A nipple 21 connects the T-fitting 19 with an elbow fitting 22, to the upper end of which a water dispensing device or fountain 23 is connected by a suitable coupling 24. The fountain 23, of course, is one of the automatic type widely known and used, so that a predetermined water level is maintained therein without the necessity for human attention. The details of such fountains form no part of the present invention.

From the foregoing description the operation of the instant device will be readily apparent. Water provided under pressure in the conduit 10 flows through the vertical conduit 11, flexible conduit 14, nipple 21, and into the fountain 23 where it automatically is maintained at a predetermined level. Elevation of the fountain 23 above the floor is quickly and easily adjusted by loosening the wing bolt 18 and adjusting the support 15 upwardly or downwardly along the conduit 11, as required, then tightening the bolt 18. Thus, the elevation of the fountain 13 may be adjusted to provide the most convenient access thereto by the poultry or other stock, and likewise to prevent contamination of the fountain by the litter present on the floor of the building, which litter may easily be projected into the fountain by the scratching of the birds if the fountain is positioned at an elevation which is lower than necessary.

The device illustrated in Figure 2 differs from that just described in that the support includes a rod portion 25 somewhat shorter than the rod portion 16 and the T-fitting 26 is disposed horizontally to accommodate conduit means comprising sections 27 and 28. The flexible conduit 14, in this case, connects with a T-fitting 29 which in turn connects with the conduit means 27 and a further conduit means 30. Fountains 23 and 23' are connected to the conduit means 30 and 28, respectively, by means of elbow fittings 31 and 31', respectively. In this way, only a single horizontal support and a single flexible conduit are needed to provide adjustability for two of the dispensing devices or fountains. The number of fountains supported by a single adjustable support 25 may be expanded, within reasonable limits, by the provision of additional conduit means connected into the system.

Having thus described the invention, what is claimed as new and desired to be secured by Letters Patent is:

1. In a stock-watering apparatus, in combination, a generally horizontal conduit, a generally vertical conduit supported on and connected to said horizontal conduit, a generally horizontal support member mounted at one end on said vertical conduit for vertical adjustment thereon, conduit means mounted on the other end of said support member, a flexible conduit connecting said vertical conduit and said conduit means, and a stock-watering device mounted on and connected to said conduit means.

2. The combination defined in claim 1, said flexible conduit connecting the upper end of said vertical conduit to said conduit means.

3. The combination defined in claim 1, the mounting of said support member on said vertical conduit comprising a sleeve portion of said support member embracing said vertical conduit, and securing means extending through said sleeve portion into engagement with the outer wall of said vertical conduit.

4. The combination defined in claim 3, said securing means comprising a manually operable set screw.

5. In a stock-watering apparatus, in combination, a generally horizontal conduit, a generally vertical conduit supported on and connected to said horizontal conduit, a generally horizontal support member mounted on said vertical conduit for vertical adjustment thereon, conduit means mounted on said support member, flexible conduit means connecting said vertical conduit and said conduit means, and stock-watering fountain means mounted on and connected to said conduit means.

6. The combination defined in claim 5, said conduit means having an inlet port connected to said flexible conduit means and a plurality of outlet ports, said fountain means comprising a plurality of devices each connected to one of said outlet ports.

References Cited in the file of this patent

UNITED STATES PATENTS

| | | |
|---|---|---|
| 1,037,054 | Rose | Aug. 27, 1912 |
| 1,624,245 | Holmes et al. | Apr. 12, 1927 |
| 1,762,316 | Wilson | June 10, 1930 |
| 2,700,370 | Goff | Jan. 25, 1955 |